United States Patent
Ichisugi et al.

(10) Patent No.: US 8,047,611 B2
(45) Date of Patent: Nov. 1, 2011

(54) HEADREST BUSHING AND VEHICLE SEAT USING THE SAME

(75) Inventors: Morihiro Ichisugi, Yokohama (JP); Daijiro Terashima, Yokohama (JP)

(73) Assignee: NHK Spring Co., Ltd, Yokohama-shi, Kanagawa (JP)

( * ) Notice: Subject to any disclaimer, the term of this patent is extended or adjusted under 35 U.S.C. 154(b) by 0 days.

(21) Appl. No.: 11/643,932

(22) Filed: Dec. 22, 2006

(65) Prior Publication Data

US 2007/0145804 A1   Jun. 28, 2007

(30) Foreign Application Priority Data

Dec. 26, 2005   (JP) .................................. 2005-373544

(51) Int. Cl.
*A47C 7/36* (2006.01)
(52) U.S. Cl. ...................................................... 297/410
(58) Field of Classification Search .................... 297/410
See application file for complete search history.

(56) References Cited

U.S. PATENT DOCUMENTS

| | | | | |
|---|---|---|---|---|
| 5,156,440 A * | 10/1992 | Vidwans | ........................ | 297/410 |
| 5,667,276 A * | 9/1997 | Connelly et al. | ............... | 297/410 |
| 6,062,645 A * | 5/2000 | Russell | ........................... | 297/410 |
| 6,305,514 B1 * | 10/2001 | Lin et al. | ........................ | 190/115 |
| 6,318,610 B1 * | 11/2001 | Doherty | ......................... | 224/271 |
| 6,454,356 B1 * | 9/2002 | Yamada | ......................... | 297/410 |
| 6,655,742 B1 * | 12/2003 | Ozaki | ............................. | 297/410 |
| 6,733,079 B2 * | 5/2004 | Gans et al. | .................... | 297/410 |
| 6,910,740 B2 * | 6/2005 | Baker et al. | ................... | 297/408 |
| 7,204,558 B2 * | 4/2007 | Tanaka | .......................... | 297/410 |
| 7,306,287 B2 * | 12/2007 | Linardi et al. | ................ | 297/410 |
| 7,338,130 B2 * | 3/2008 | Daume | .......................... | 297/410 |
| 2003/0151290 A1 * | 8/2003 | Gans et al. | .................... | 297/410 |
| 2003/0222493 A1 * | 12/2003 | Ozaki | ............................ | 297/410 |
| 2005/0200185 A1 | 9/2005 | Yokoyama et al. | | |
| 2006/0108851 A1 * | 5/2006 | Tsutsui et al. | ................ | 297/410 |
| 2006/0186720 A1 * | 8/2006 | Linardi et al. | ................ | 297/410 |
| 2006/0214491 A1 * | 9/2006 | Metz et al. | ..................... | 297/410 |
| 2006/0214492 A1 * | 9/2006 | Hassler et al. | ................ | 297/410 |
| 2006/0220434 A1 * | 10/2006 | Schulz et al. | .................. | 297/410 |
| 2006/0250017 A1 * | 11/2006 | Otto et al. | ...................... | 297/410 |

FOREIGN PATENT DOCUMENTS

| | | |
|---|---|---|
| JP | 50-022417 | 7/1975 |
| JP | 02-092744 | 7/1990 |
| JP | 04-193109 | 7/1992 |
| JP | 08-005083 | 1/1996 |
| JP | 08-084634 | 4/1996 |
| JP | 2005-253866 | 9/2005 |
| JP | 2005-255100 | 9/2005 |

* cited by examiner

*Primary Examiner* — Sarah B McPartlin
(74) *Attorney, Agent, or Firm* — Nixon Peabody LLP; Jeffrey L. Costellia

(57) ABSTRACT

A headrest bushing into which a headrest stay are inserted for supporting a head rest includes a lock mechanism for preventing disengagement of the headrest stay from the headrest bush; and an unlock mechanism having a button for unlocking the lock mechanism and a housing for accommodating which has an opening for manipulating the button, and wherein a surface of the button is placed inwardly from the opening of the housing. The surface of the button is placed correspondently to the opening of the housing or inwardly in a pressing direction from the opening of the housing. The headrest stay has a notch consisting of a horizontal surface and an inclined surface to increase its diameter of slowly downward from the deepest part of the horizontal surface, and wherein the horizontal surface of the notch engages with the lock mechanism.

5 Claims, 11 Drawing Sheets

HEADREST BUSHING AND VEHICLE SEAT USING THE SAME

CROSS-REFERENCE TO RELATED APPLICATIONS

This application is based upon and claims the benefit of priority from the prior Japanese Patent Applications No. 2005-373544, filed on Dec. 26, 2005, the entire contents of which are incorporated herein by reference.

TECHNICAL FIELD

The present invention relates to a vehicle seat, and more particularly to a headrest bushing into which a headrest stay is inserted for supporting a headrest of the headrest stay.

BACKGROUND OF THE INVENTION

Conventionally, a headrest is generally installed in a vehicle seat for an automotive to improve safety of an occupant from an accident such as collisions between vehicles. This headrest possesses a height adjusting mechanism so that an arbitrary point can adjust height location by a physical constitution and preference of an occupant. Generally, two headrest stays are adhered to the headrest. The headrest stays are inserted into two headrest bushing anchored at the side of the seat back respectively and then supported.

In the headrest, a head impact force of an occupant seating on a seat becomes a load in the case of a collision, thus the force that is going to depress the headrest is exerted. Due to the force exerted, the headrest moves to the lower portion, an occupant's head cannot be supported, and the security of safety for the occupant is difficult because the headrest is not in condition that the occupant's head is not completely covered. Therefore, a vehicle seat with a height adjusting mechanism is provided in one of headrest bushings in support of the headrest stays (Japanese Patent Laid-Open No. 1992-193109 Official Gazette). The height adjusting mechanism permits a movement to the upper portion of the headrest, but the movement to the lower portion comes to be locked, and a button to release the lock is provided therefor.

FIG. 10 depicts an exploded perspective view showing the vehicle seat. The numeral 1 of FIG. 10 depicts a seatback, 2 of FIG. 10 depicts a headrest, and 3a and 3b are designated as headrest stays in support of a headrest 2. The numerals 6a and 6b of FIG. 10 are designated as headrest bushings into which a headrest stay 3 is inserted and is supported. In the headrest bushing 6a, a height adjusting mechanism 7, which allows the movement to the upper portion of the headrest stay 3a and prevent the movement to the lower portion, is installed freely in advance or retreat in a perpendicular direction to the headrest stay 3. The height adjusting mechanism 7 is formed by an abutting lock plate 8 in contact with the headrest stay 3a, and a spring 12 (not shown). An outside of the height adjusting mechanism 7 is covered by a housing 13, a button 8b of the abutting lock plate 8 is only exposed to the outside. The headrest stay 3a is provided with height adjusting notch 4 in a predetermined space (hereinafter referred to as a "height adjusting notch"). The height adjusting notch 4 is formed by a horizontal surface 4a toward the center of the headrest stay 3a, and an inclined surface 4b to increase the diameter of slowly downward from a deepest portion of the horizontal surface 4a. In the height adjusting mechanism 7, by pulling the headrest 2 upward an abutment 8a in contact with the headrest stay 3a of the lock plate 8 is disengaged from the height adjusting notch 4 against an elastic force of a spring 12 by action of the incline surface 4b of the height adjusting notch 4. The headrest 3a is movable upward, and the headrest 2 can be adjusted in its height. On the contrary, the lock plate 8 is not disengaged from the height adjusting notch 4 in engagement with a horizontal surface 4a of the height adjusting notch 4 when the headrest 2 is pushed downward. This can prevent from moving to the lower portion of the headrest 2, however, the button 8b of the lock plate 8 is disengaged from the height adjusting notch 4 by pushing against the spring 12, thereby moving to the lower portion of the headrest stay 3a.

A falling-off preventive mechanism is arranged to the headrest bushing in a free state for preventing the headrest stay from falling-off, the falling-off preventive mechanism is also provided in the inside of the seatback (U. S. patent application publication US2005/200185).

However, the headrest stay is inserted into the two headrest bushings, one of which is in a free state without having any of mechanisms according to the vehicle seat in Japanese Patent Laid-Open No. 1992-193109 Official Gazette. Therefore, the headrest is disengaged from the seatback easily when an upward force acts on the headrest (for example, it may be contemplated in the case that an occupant pulls the headrest out).

Consequently, in the other headrest bushing with the height adjusting mechanism there is provided with a vehicle seat comprising: a locking mechanism for stopping the movement to the upper portion of the headrest stay and for preventing disengagement of the headrest, and a mechanism having a locking/unlocking mechanism (hereinafter referred as to a "falling-off preventive mechanism").

FIG. 11 shows a main exploded perspective view of a vehicle seat having the headrest comprising the falling-off preventive mechanism. All of the components which occur identically in FIG. 10 have the same reference numerals respectively, a description on the components is omitted.

The numeral 5 of FIG. 11 is designated as a notch for preventing the headrest 2 from falling-off (hereinafter referred as to a "falling-off preventive notch"), the numeral 9 is the falling-off preventive mechanism, and the numeral 10b is an operating button for unlocking the falling-off preventive mechanism 9. The headrest bushing 6b is embedded in the inside of the seatback 1, and the falling-off preventive mechanism 9 has a construction to be installed in the upper portion in the form protruded outside from the seatback 1. The falling-off preventive mechanism 9 is installed freely in advance or retreat in the perpendicular form to the headrest stay 3b. The headrest stay 3b is inserted through the falling-off preventive mechanism 9. The falling-off preventive mechanism 9 comprises the lock plate 10 and the spring 12 (not shown). The lock plate 10 comprises a button 10b to unlock an abutment (not shown) in contact with the headrest stay 3b. The falling-off preventive notch 5 is formed by a horizontal surface 5a, and an inclined surface 5b to increase the diameter slowly upward from the deepest portion of the horizontal surface 5a. When the lock plate 10 reaches the position of the falling-off preventive notch 5, the abutment (not shown) of the lock plate 10 engages the horizontal surface 5a of the falling-off preventive notch 5. This allows to lock the movement to the upper portion of the headrest stay 3b. When the locked movement is unlocked, by pushing the outside exposed button 10b of a housing 13 the abutment (not shown) disengages the horizontal surface 5a of the falling-off preventive notch 5, and the locked headrest stay 3b is unlocked.

However, in the headrest busing 3b as mentioned above when the falling-off preventive mechanism 9 unlocks the locked headrest stay 3b, the button 10b for unlocking the locked headrest stay 3b is exposed to the outside of the housing to accommodate the falling-off preventive mechanism 9. Accordingly, even supposing that the occupant merely touches, if the button 10b is pushed, the locked movement to the upper portion of the headrest 2 may be sufficiently unlocked. Even though the lock may be unlocked with such a mere touch, the headrest may be disengaged when the occupant does not intend, and a dangerous situation also may occur.

The present invention is to provide the headrest bushing having the headrest 2 not dislocated from the seatback 1 and the vehicle seat therewith, if the invention is performed, not by an intentional action forcing the headrest 2 to be disengaged from the seatback 1.

SUMMARY OF THE INVENTION

A headrest bushing into which a headrest stay are inserted for supporting a head rest according to one embodiment of the present invention comprising:
  a lock mechanism for preventing disengagement of said headrest stay from said headrest bush; and
  an unlock mechanism having a button for unlocking said lock mechanism and a housing for accommodating said lock mechanism, which has an opening for manipulating said button; and
  wherein a surface of said button is placed inwardly from said opening of said housing.

A vehicle seat according to one embodiment of the present invention comprising a seatback and a headrest, said headrest comprising:
  a headrest main body;
  a first and second headrest stays for supporting said headrest main body; and
  a first and second headrest bushes into which said first and second headrest stays are inserted respectively; said first headrest bush comprising:
    a first lock mechanism for preventing disengagement of said first headrest stay from said first headrest bush; and
    a first unlock mechanism having a first button for unlocking said first lock mechanism and a housing for accommodating said first lock mechanism, which has an opening for manipulating said button; and
    wherein a surface of said first button is placed inwardly from said opening of said housing.

A vehicle seat according to one embodiment of the present invention comprising a seatback and a headrest, said headrest comprising:
  a headrest main body;
  a first and second headrest stays for supporting said headrest main body; and
  a first and second headrest bushes into which said first and second headrest stays are inserted respectively;
  said first headrest bush comprising:
    a first lock mechanism for preventing disengagement of said first headrest stay from said first headrest bush; and
    a first unlock mechanism having a first button for unlocking said first lock mechanism and a first housing for accommodating said first lock mechanism, which has a first opening for manipulating said first button;
    wherein a surface of said first button is placed inwardly from said first opening of said first housing; and
  said second headrest bushing comprising:
    a second lock mechanism for preventing said second stay from moving to the lower portion; and
    a second unlock mechanism having a second button for unlocking said second lock mechanism and a second housing for accommodating said second lock mechanism, which has a second opening for manipulating said second button;
    wherein a surface of said first button is placed inwardly from said first opening of said first housing; and
    wherein a surface of said second button protrudes outside from said second housing.

DETAILED DESCRIPTION OF THE INVENTION

Embodiment 1

Figure 1:
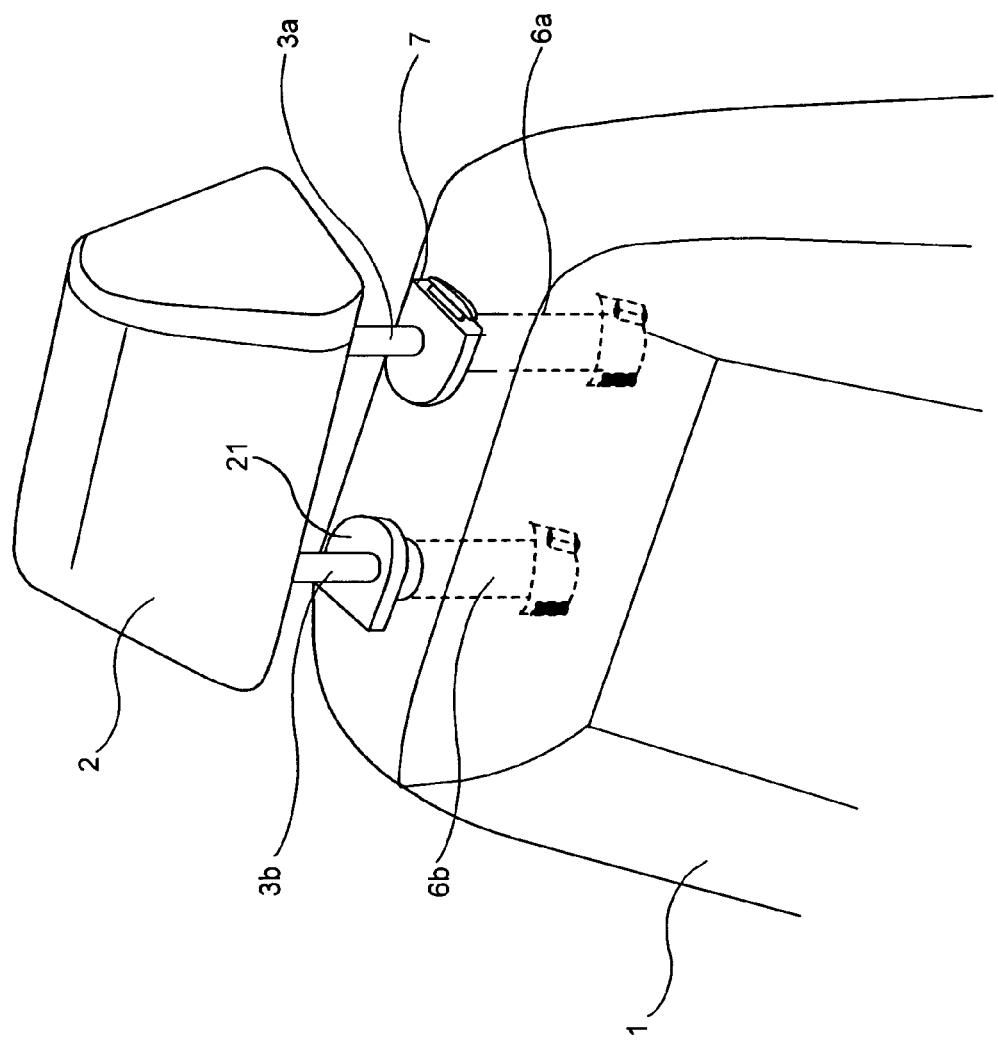
FIG. 1 is a perspective view showing headrest bushings and one preferred embodiment of a vehicle seat of the present invention.

Referring now to the drawings from FIG. 1 to FIG. 9, one embodiment according to the present invention is described. The vehicle seat and identical components which are shown in FIGS. 10 and 11 have the same numeral, a description is made.

Referring now to FIG. 1, FIG. 1 depicts a perspective view showing a preferred embodiment according to the invention. The numeral 1 of FIG. 1 depicts a seatback, 2 of FIG. 1 may be described as a headrest main body, the main body (hereinafter merely referred as to a "headrest") forming a headrest body according to this embodiment of the invention, and 3a and 3b are designated as headrest stays.

Figure 2:
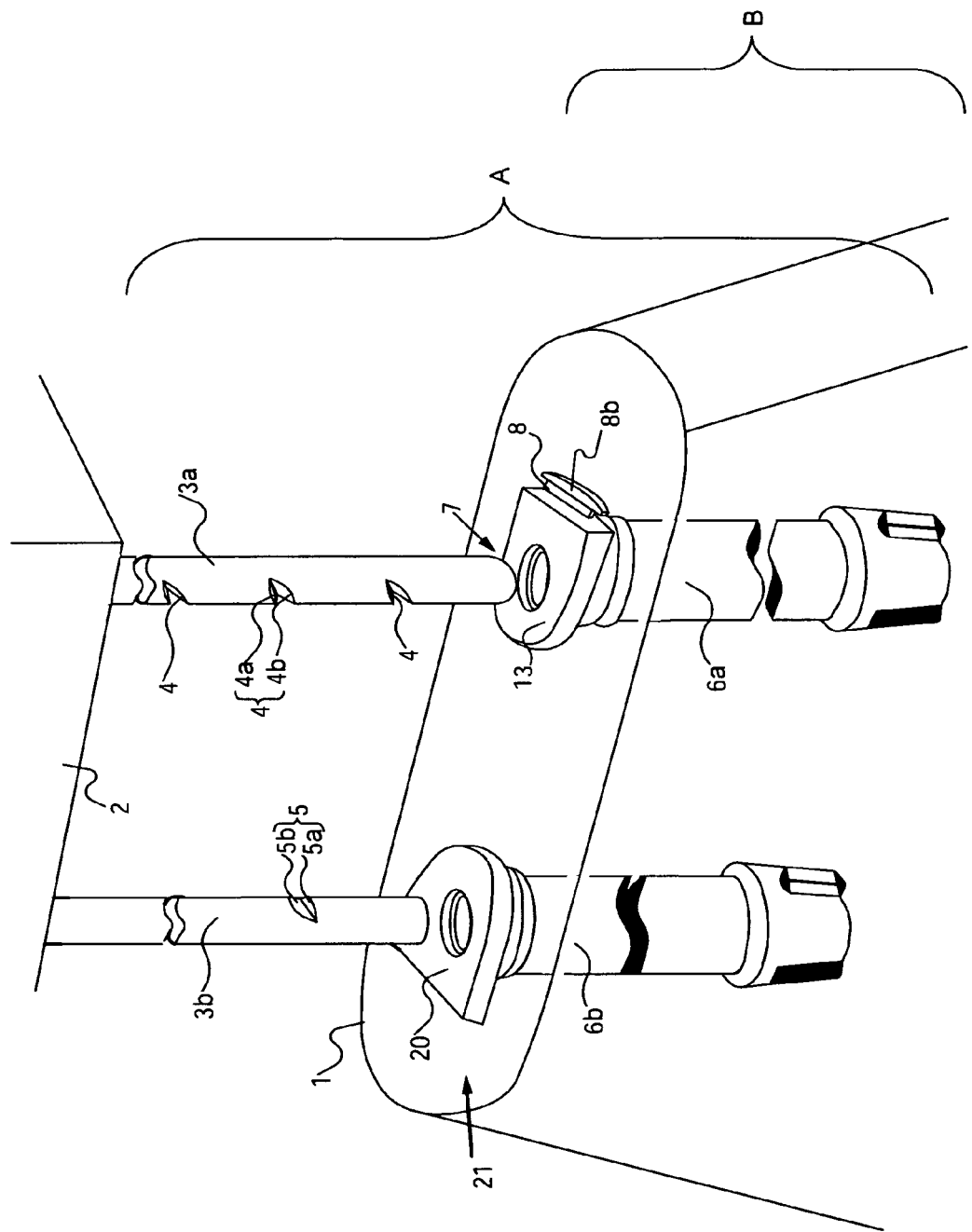
FIG. 2 is a main exploded perspective view showing the headrest bushings and a preferred embodiment of a vehicle seat according to the present invention.
Figure 7:
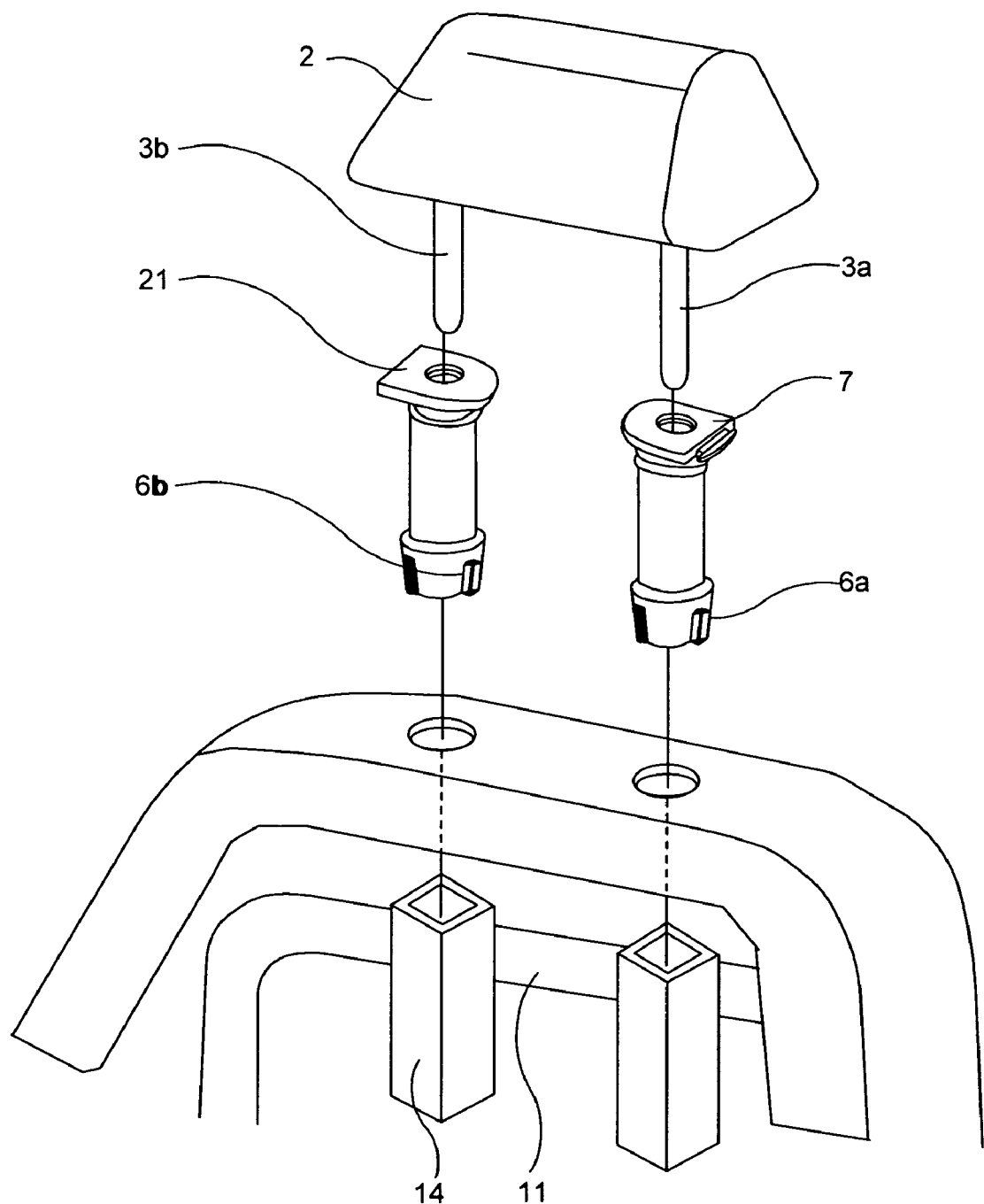
FIG. 7 is an exploded perspective view showing a preferred embodiment according to the invention.

Referring now to FIG. 2, FIG. 2 depicts a main exploded perspective view showing a preferred embodiment according to the invention. The numeral A of FIG. 2 depicts a headrest portion comprising of a headrest 2, headrest stays 3a and 3b, and headrest bushings 6a and 6b. The numeral B of FIG. 2 is designated as a seatback. In the headrest 2, the headrest stays 3a and 3b are supported to be inserted into the headrest bushings 6a and 6b in the form of tube anchored at the upper end position of a seatback 1. There are provided with two of the headrest stays 3a and 3b installed in right and left. The headrest bushings 6a and 6b are fixedly mounted to the seatback frame 11 of the seatback 1 as shown in FIG. 7. More particularly, a tube-shaped mounting member 14 is connected to a seatback frame 11, and is fixed to be inserted into the mounting member 14. In the headrest bushings 6a and 6b one of the headrest bushings 6a has the height adjusting mechanism 7, and a disengagement preventive mechanism 21 is arranged to the other. By the height adjusting mechanism 7 the headrest 2 (the headrest stay 3a) are halted (held) at a given height, and by the disengagement preventive mechanism 21 the headrest 2 (the headrest stay 3b) is composed for prevention of falling-off. What is a "disengagement preventive mechanism" herein called is the mechanism comprising: a locking mechanism for preventing disengagement of the headrest stay 3b inserted into the headrest bushing 6b, a button for unlocking the locking mechanism, and an unlocking mechanism having a housing to accommodate the button.

Figure 3:
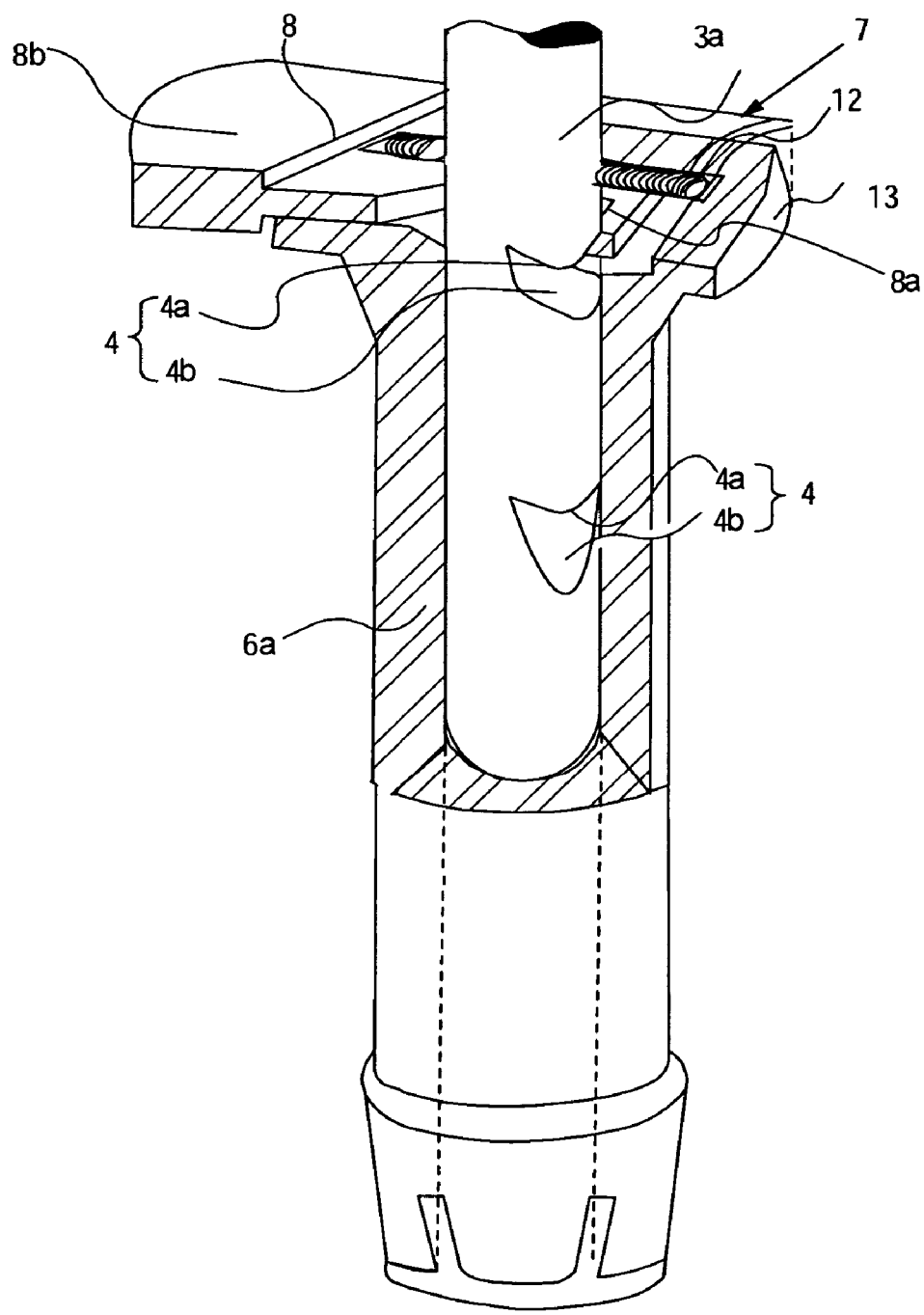
FIG. 3 is a partial cutaway perspective view of a height adjusting mechanism showing a preferred embodiment according to the invention.

The height adjusting mechanism 7 is arranged to the upper end of the seatback 1 of the headrest bushing 6a. FIG. 3 depicts a partial cutaway perspective view of the height adjusting mechanism 7. The height adjusting mechanism 7 in FIG. 3 is described in detail. In the height adjusting mechanism 7, the lock plate 8 as a locking member to the headrest bushing 6a is attached in advance or retreat in a perpendicular direction to the headrest stay 3a. The headrest stay 3a passes through the lock plate 8 to be inserted into the headrest bushing 6a. The headrest stay 3a has the space that the lock plate 8 can move (translate back and forth) therebetween, a portion 8a of the lock plate 8 is abutted on the perforated headrest stay 3a by a resilience of the spring 12. The lock plate 8 and spring 12 are accommodated in the housing 13, and only the button 8b of the lock plate 8 is protruded. It may be allowed to unlock the lock plate 8 by the mere pushing of the button 8b. In the headrest stay 3a a plurality of the height adjusting notches 4 are arranged in a predetermined space. The height adjusting notches 4 are formed of the horizontal surface 4a toward the center of the headrest stay 3a, and an inclined surface 4b to increase the diameter of slowly downward from the deepest part of the horizontal surface 4a.

Therefore, by pulling (falling-off) the headrest 2 upward an abutment 8a in touch with the headrest stay 3a of the lock plate 8 is disengaged from the height adjusting notches 4 against an elastic force (a spring force) of the spring 12 by action of the incline surface 4b of the height adjusting notches 4, so that the headrest stay 3a is movable upward, and the headrest 2 adjustable in its height. In the movement to the lower portion, the horizontal surface 4a of the height adjusting notches 4 engage the lock plate 8 to be locked and halted in place. On the contrary, the lock plate 8 is not disengaged from the height adjusting notches 4 in engagement with a horizontal surface 4a of the height adjusting notches 4 when the headrest 2 is pushed downward. Thus, when the button 8b of the lock plate 8 is pushed, then the lock is unlocked, the movement may be available to the lower portion of the headrest stay 3a, so that the headrest 2 can be regulated downward.

Figure 4:
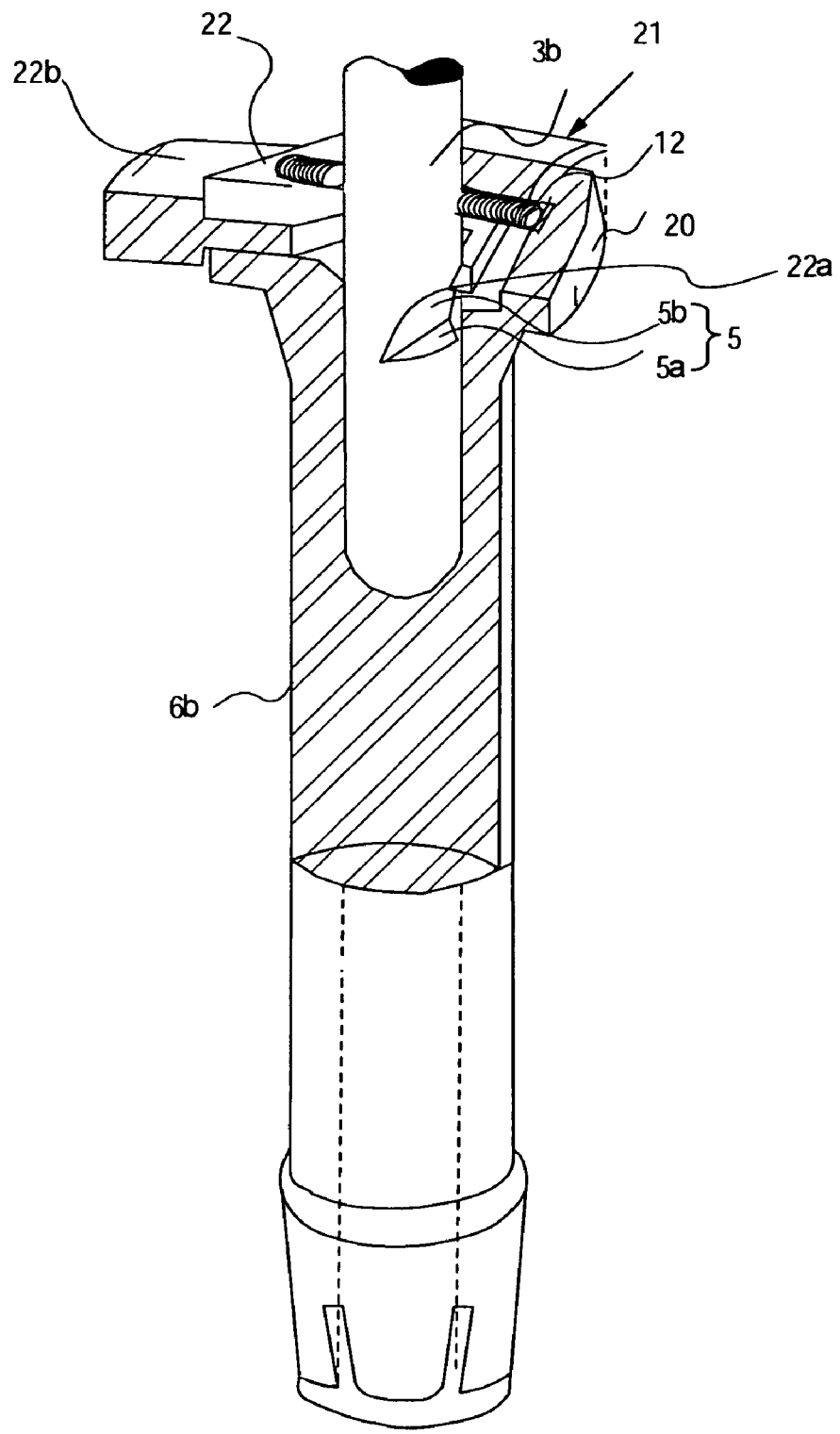
FIG. 4 is a partial cutaway perspective view of a disengagement preventive mechanism showing a preferred embodiment according to the invention.

Referring now to FIG. 4, FIG. 4 depicts partial cutaway perspective view of the disengagement preventive mechanism. The disengagement preventive mechanism 21 is arranged on an upper end position of the seatback 1 of the headrest bushing 6b. The disengagement preventive mechanism 21 has a generally same construction as the height adjusting mechanism 7, but there is a difference in which the falling-off preventive notch 5 is arranged in the lower portion of the inserted headrest stay 3b. That is, in the disengagement preventive mechanism 21, as shown in FIG. 4, the lock plate 22 as a locking member to the headrest bushing 6b is attached in advance or retreat in a perpendicular direction to the headrest stay 3b. The headrest stay 3b passes through the lock plate 22 to be inserted into the headrest bushing 6b. A portion that the headrest stay 3b passes through the lock plate 22 has a space for allowing the lock plate 22 to move front and back between the headrest stay 3b and the lock plate 22. A portion 22a of the lock plate 22 is abutted on the perforated headrest stay 3b by a resilience of the spring 12. The lock plate 22 and the spring 12 are accommodated in the housing 20. By pushing the button 22b formed a part of the lock plate 22, it may be allowed to unlock the lock plate 22. Subsequently, the falling-off preventive notch 5 is arranged to the lower portion of the headrest stay 3b. The falling-off preventive notch 5 is formed of the horizontal surface 5a toward the center of the headrest stay 3b, and an inclined surface 5b to increase the diameter slowly upward from the deepest part of the horizontal surface 5a.

Accordingly, the headrest stay 3b is free to move up and down. However, when the falling-off preventive notch 5 moves up and down so as to reach the position of the lock plate 22, the lock plate 22 engages the falling-off preventive notch 5, thereby locking the horizontal surface 5a and preventing the up and down movement, so that the headrest stay 3b is not able to move up and down anymore, thereby allowing the headrest 2 to be prevented from falling-off. When the headrest stay 3b is further moved up and down, and is pulled out, the lock plate 22 can be unlocked by the pushing of the button 22b. More particularly, when the locked movement to the lower portion of the headrest stay 3b is unlocked by the pushing of the button 22b, without being enough by a weak pressing force of the extent such as a mere touch, the pressing force is required such that the engagement between the lock plate 22 and the horizontal surface 5a of the falling-off preventive notch 5 is disengaged.

In the portion that the headrest stay 3a and 3b in FIG. 3 and FIG. 4, by providing with a space that the lock plates 8 and 22 can move (translate back and forth) between the headrest stays 3a and 3b and the lock plates 8 and 22, the lock plates 8 and 22 can be pressed and moved to unlock the engagement (lock) with the height adjusting notches 4 and the falling-off preventive notch 5. Accordingly, the space is required when unlocking from the height adjusting notches 4 of the lock plates 8 and 22, and the falling-off preventive notch 5.

As set forth in FIGS. 3 and 4, in the height adjusting mechanism 7, by pulling the headrest 2 upward the abutment 8a in touch with the headrest stay 3a of the lock plate 8 is disengaged from the height adjusting notch 4 against an elastic force of the spring 12 by action of the incline surface 4b of the height adjusting notch 4, so that the headrest stay 3a is movable upward, and the headrest 2 adjustable in its height. On the contrary, the lock plate 8 is not disengaged from the height adjusting notches 4 in engagement with the horizontal surface 4a of the height adjusting notches 4 when the headrest 2 is pushed downward. Consequently, when the button 8b of the lock plate 8 is pushed, then the lock is unlocked against the spring 12, the movement may be available to the lower portion of the headrest stay 3a, so that the headrest 2 can be regulated downward. As such, the height adjusting mechanism 7 of this embodiment of the invention can adjust its height by pulling the headrest 2 upward; the lock plate 8 may be unlocked by pushing the button 8b to be thereby depressed downward. The control button 8b is located on the upper end of the seatback, which can be easily manipulated.

Similarly, as set forth in FIGS. 3 and 4, even though the disengagement preventive mechanism 21 moves to the upper potion of the headrest 2, when the falling-off preventive notch 5 of the headrest stay 3b reaches the position of the lock plate 22, the lock plate 22 engages the falling-off preventive notch 5, thereby locking the horizontal surface 5a and preventing from falling off.

Figure 5:
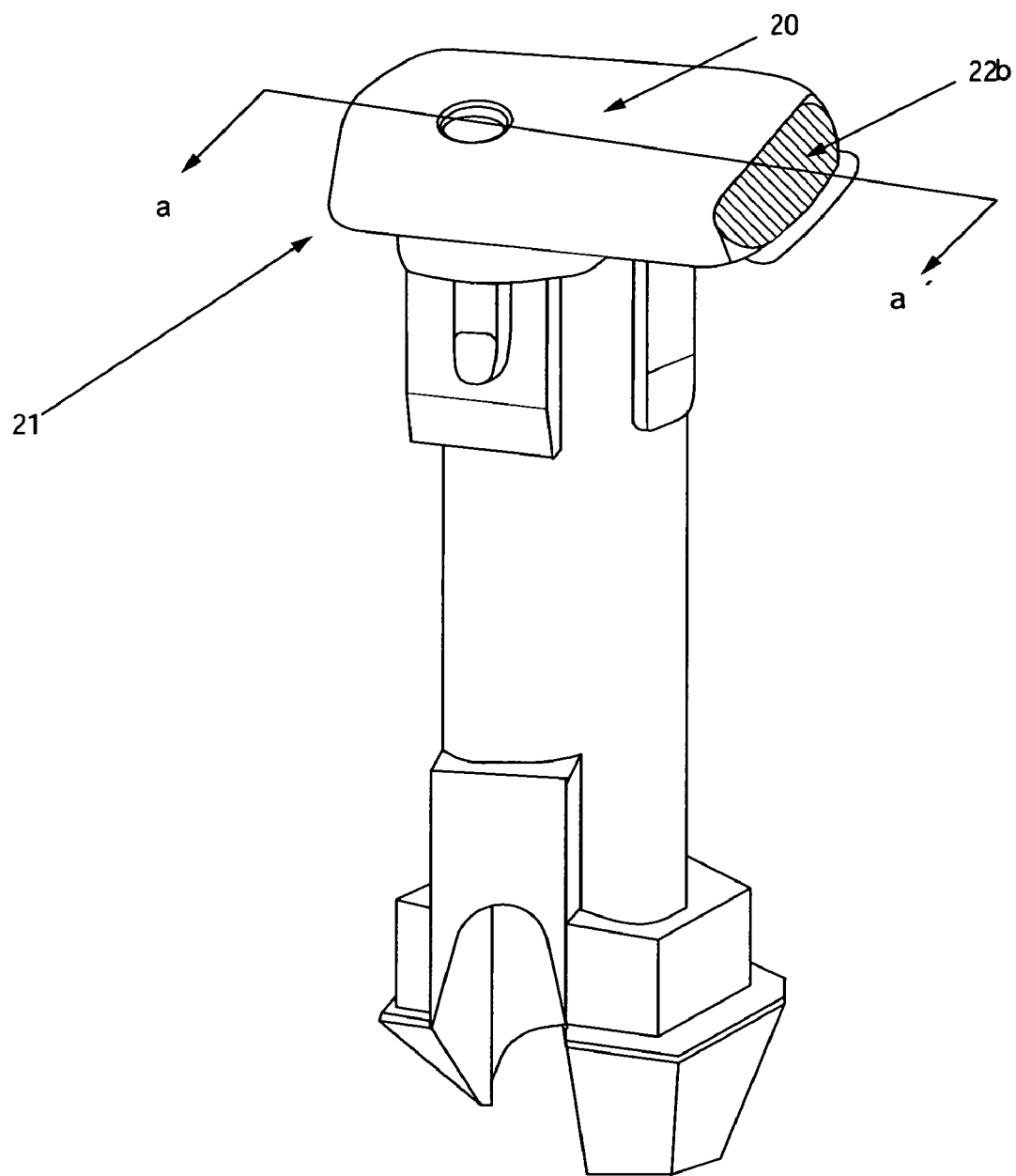
FIG. 5 is a perspective view showing a detailed description of a preferred embodiment of the present invention which is in a state covered by a housing.

Referring now to FIG. 5 and FIG. 6, a detailed description is made of the falling-off preventive mechanism. FIG. 5 shows a perspective view of the housing 20 that accommodates the lock plate 22 and the spring 12 of the falling-off preventive mechanism 21. This allows the lock plate 22 and the spring 12 of the falling-off preventive mechanism 21 to be in the state covered by the housing 20, there is an opening on the surface of the housing 20 in internal contact with the button 22b of the lock plate 22. Hereinafter the portion having an opening surface of the housing 20 may be referred as to an "opening". This allows the button 22b to be manipulated.

Figure 6A:
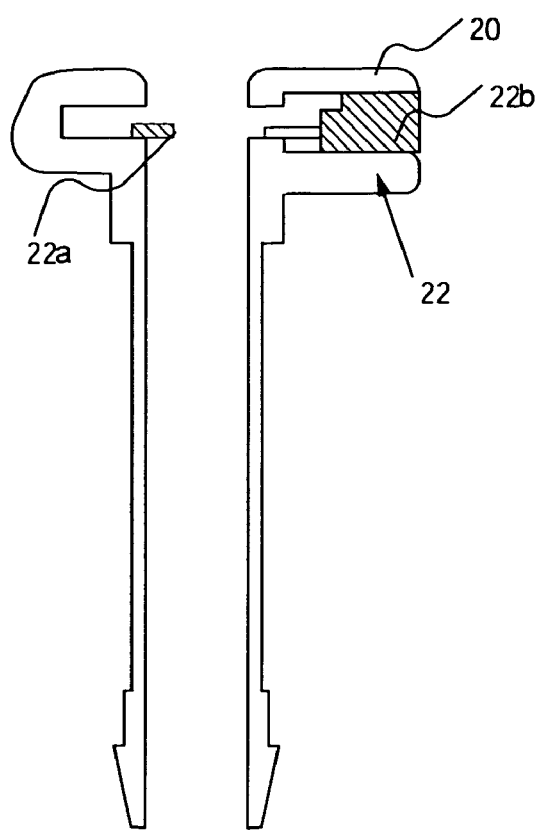
FIG. 6A and FIG. 6B are sectional views which cut away the disengagement preventive mechanism of FIG. 5 with line a-a', respectively.
Figure 6B:
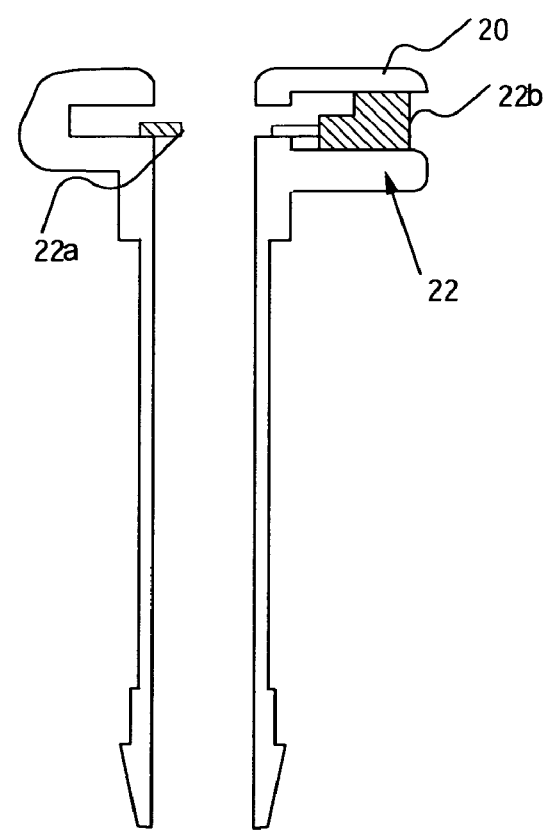

FIG. 6A and FIG. 6B is a sectional view which cuts away the housing 20 accommodating the lock plate 22 and the spring 12 of the falling-off preventive mechanism 21 with line a-a'. On the left upper end of the headrest bushing 6b the abutment 22a, which is a portion of the lock plate 22 in contact with the headrest stay 3b, is located, and on the right upper end of the headrest bushing 6b the button 22b is located for unlocking the horizontal surface 5a of the falling-off preventive notch 5 arranged to the lock plate 22 and the headrest stay 3b. FIG. 6A and FIG. 6B can be seen in the state having the lock plate 22 separated in right and left sides due to the fact that FIG. 5 is taken along line a-a', but as mentioned above the abutment 22a and the operating button 22b are integrated into one of the lock plate 22. Similarly, the spring 12 for resisting the lock plate 22 from the headrest stay 3b is arranged behind the lock plate 22.

FIG. 6A is a view showing the state that the surface of the button 22b of the lock plate 22 corresponds to the opening of the housing 20. FIG. 6B is a view showing the state that the surface of the button 22b of the lock plate 22 was placed inwardly in a pressing direction from the opening of the housing 20. By such an arrangement the button 22b would be not pushed and unlocked without implementing an occupant intentional work.

When the lock plate 22 of the headrest stay 3b is unlocked to further pull out the headrest 2, the headrest 2 can be pulled out by the pushing of the button 22b of the lock plate 22 for unlocking. More particularly, when the headrest 2 is pulled out, the lock plate 22 is unlocked by the pushing of the button 22b for raising the headrest 2 to the most subjacent notch 4 among a plurality of the height adjusting notches 4 of the headrest stay 3a in this embodiment of the present invention. This work can be manipulated with one hand. Next, the most subjacent notch 4 is unlocked, and the headrest 2 is raised to the falling-off preventive notch 5 of the headrest stay 3b in this embodiment of the invention. This work can also be manipulated with one hand. Furthermore, while raising the headrest 2 with one hand, the headrest 2 is unlocked by the pushing of the button 22b formed a portion of the lock plate 22 with another hand, and is removed. The numbers of the notches are not limited to the above-mentioned numbers.

According to this embodiment of the present invention, the falling-off preventive mechanism 21 is arranged to the upper end of the seatback 1 as shown in FIG. 1 and FIG. 2, unlikely a conventional vehicle seat that the falling-off preventive mechanism 9 is arranged in the inside of the seatback 1, and it allows to work easily when the headrest is removed from the seatback upon cleaning up or maintenance.

In this embodiment, the position that the falling-off preventive notch 5 of the headrest stay 3b of the headrest 2 reaches and locks the position of the lock plate 22 corresponds to the position that the lock plate 8 is locked to the most subjacent height adjusting notch 4 of the headrest stay 3a in the height adjusting mechanism 7, when the falling-off preventive mechanism 21 locks the headrest 2 to be pulled out upward, even if an external force is removed, the headrest 2 is preferable to hold its position.

Referring to the vehicle seat according to the invention, the locking mechanism and the unlocking mechanism for preventing disengagement from the seatback of the headrest are covered by the housing with the opening, the button should be pushed at the strength of the extent allowing to be unlocked. In this is manner, it would not allow to unlock without implementing a human intentional work.

Therefore, "A headrest is uncapable of being removed unless the headrest is made into an internal action that is clearly different from an action required for adjustment." is defined and satisfied in U. S. Federal Motor Vehicle Safety Standards (hereinafter referred as to "FMVSS") 202aS4 clause 5, and it can be thought that safety is secured enough.

Embodiment 2

Figure 8:
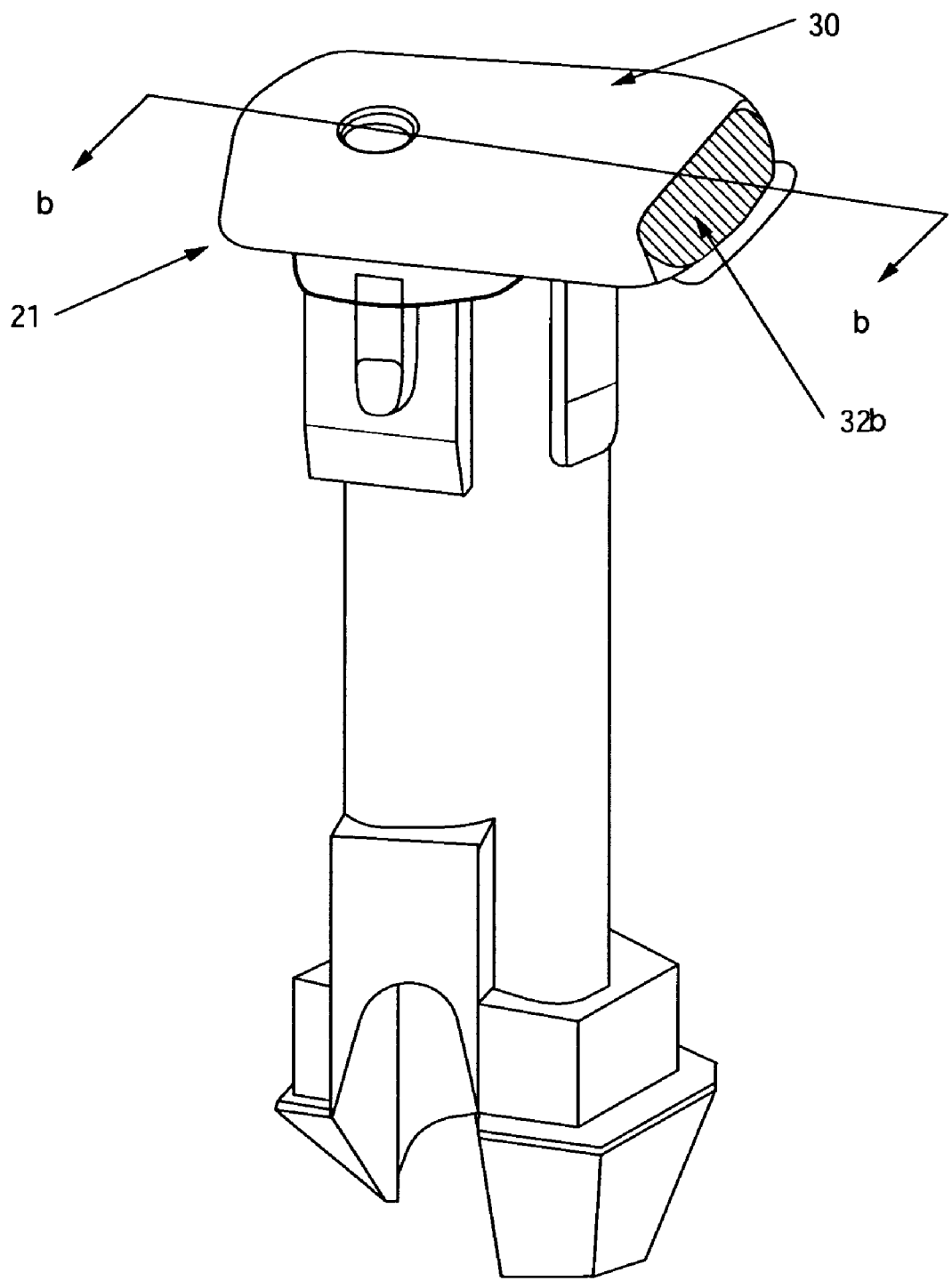
FIG. 8 is a perspective view showing other detailed description of a preferred embodiment of the present invention which is in a state covered to a housing.

Referring now to FIG. 8, FIG. 8 depicts a vehicle seat of the other embodiment according to the present invention. The numeral 30 of FIG. 8 depicts the housing covering the disengagement preventive mechanism 21, and 32b depicts a button for unlocking the lock plate 32 of the disengagement mechanism 21. The housing 30 has an opening for opening the surface opposed to the pressing surface of the button 32b of the lock plate 32. The surface of the button 32b is arranged in a pressing direction from the opening of the housing 30, in other words, at the inside of the housing 30 (including the housing that corresponds to the opening of the housing 30). As this embodiment of the present invention only differs in the housing of the disengagement preventive mechanism and the shape (width dimension) of the locking member, and other component uses the same member as same as the embodiment 1 is used, the description of which is omitted.

Figure 9:
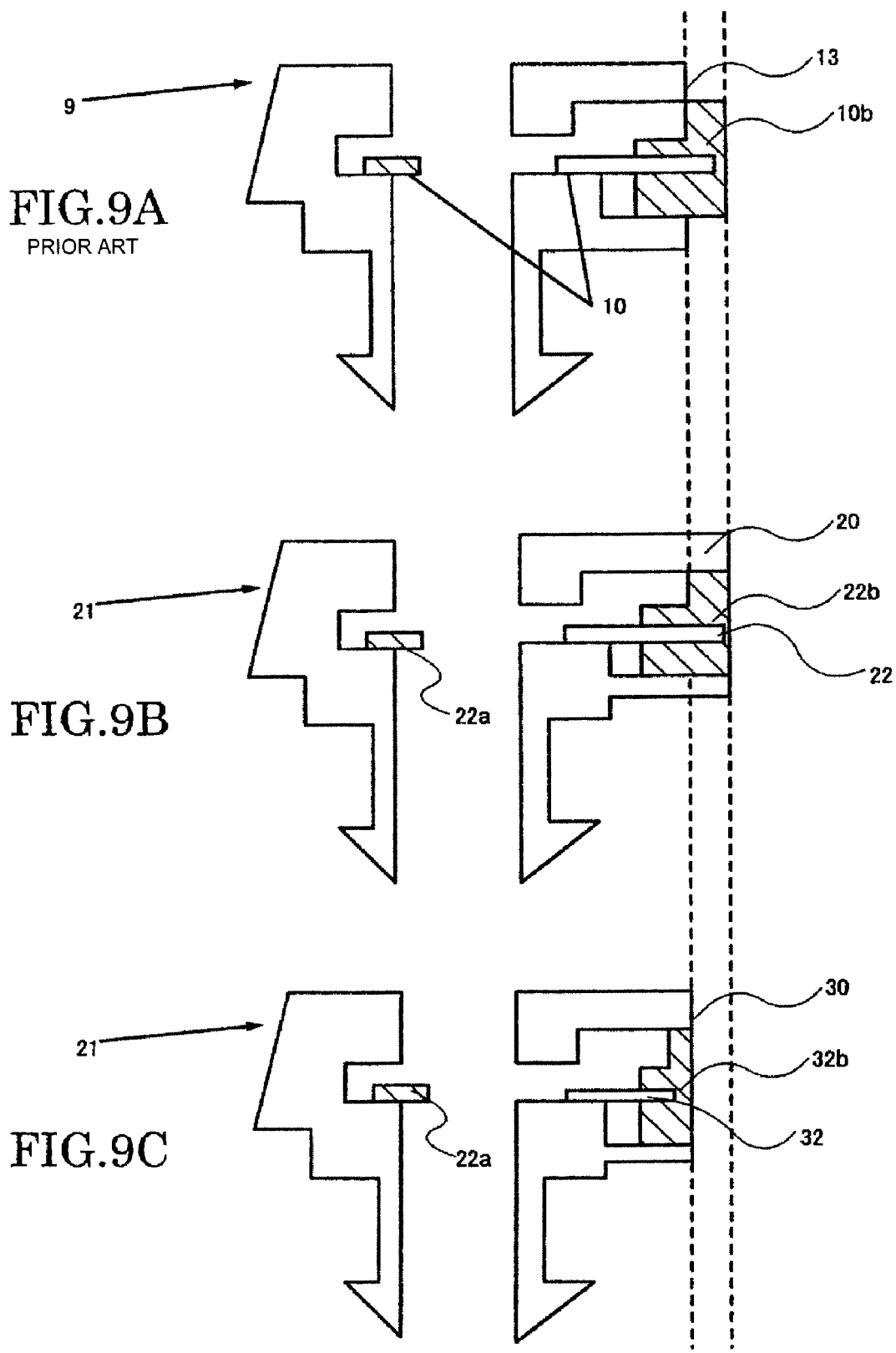
FIG. 9A, FIG. 9B and FIG. 9C are sectional views which cut away the disengagement preventive mechanism of FIG. 8 with b-b', respectively.
Figure 10:
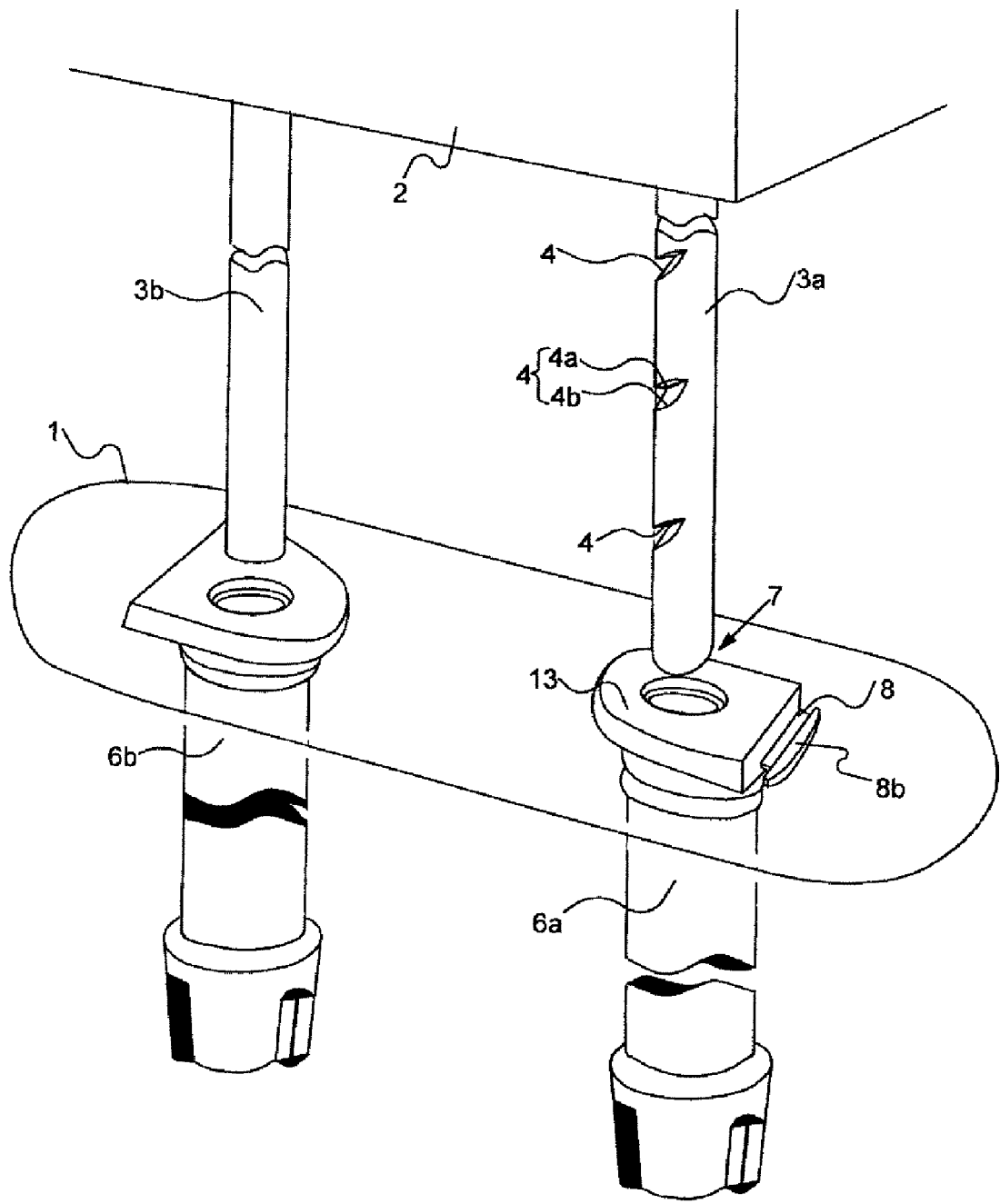
FIG. 10 is a main exploded perspective view showing a vehicle seat comprising only a conventional height adjusting mechanism.
Figure 11:
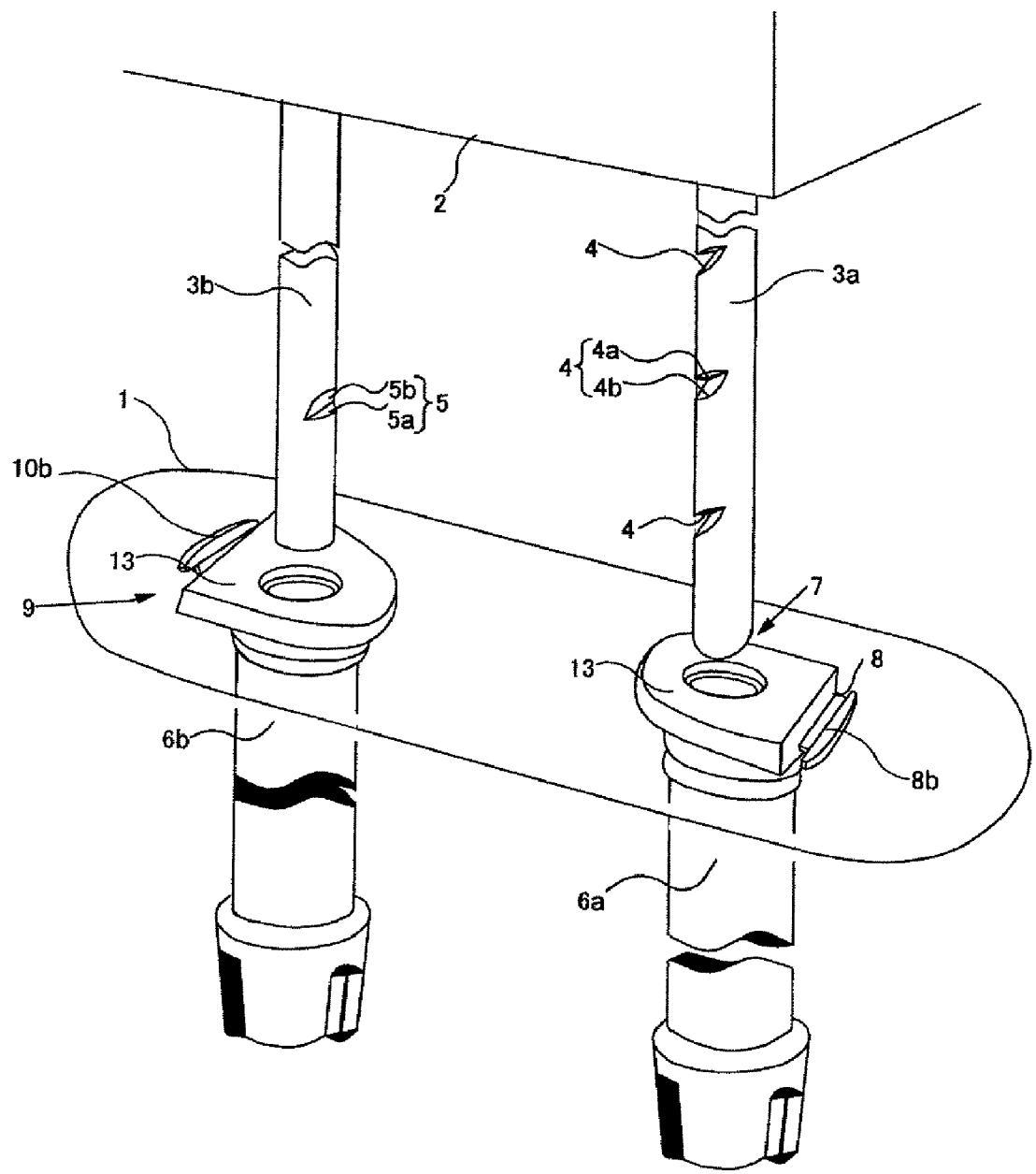
FIG. 11 is a main exploded perspective view showing the vehicle seat comprising a conventional falling-off preventive mechanism.

Referring now to FIG. 9, FIG. 9A depicts a sectional view of the disengagement preventive mechanism for use in a conventional vehicle seat as shown in FIG. 10. FIG. 9B depicts a sectional view of the disengagement preventive mechanism of the embodiment 1 according to the present invention described above. FIG. 9C depicts a sectional view of the disengagement preventive mechanism which cuts away with line b-b' of FIG. 8 of this embodiment 3 according to the present invention.

In this embodiment according to the invention, the width dimension of the housing 30 is identical as the housing mounted to a conventional disengagement preventive mechanism, but the lock plate 32 is shorter in its width dimension than a conventional locking member 12. This allows the lock plate 32 to be covered by the housing 30, so that the button 32b is accommodated in the housing 30 without being protruded. As the button 32b is arranged to the inside of the housing 30, if free of intentionally pushing the button 32b, the lock plate 32b may not be unlocked unless the button 32b is intentionally pushed.

The embodiment described herein is not intended to limit the present invention, various modifications can be made without departing from the scope and sprit of the present invention.

Embodiment 3

The vehicle seat according to the present invention can be applied to not only a motor vehicle but also other vehicle such as a railway and an airplane. Additionally, the headrest bushing according to the invention can be applied to not only a vehicle seat but also other vehicle seat.

What is claimed is:

1. A vehicle seat comprising a seatback and a headrest, said headrest comprising:
   a headrest main body;
   first and second headrest stays for supporting said headrest main body; and
   first and second headrest bushings into which said first and second headrest stays are inserted respectively;
   said first headrest bushing having a disengagement preventive mechanism comprising:
      a first lock mechanism for preventing disengagement of said first headrest stay from said first headrest bushing when locked;
      first unlock mechanism having a first button for unlocking said first lock mechanism to thereby allow disengagement of said first headrest stay from said first headrest bushing, wherein said first button is movable to a first position and a second position; and
      a first housing for accommodating said first lock mechanism, wherein said first housing has a first opening for allowing direct manipulation of said first button;
   said second headrest bushing comprising:
      second lock mechanism for preventing said second headrest stay from moving downward toward said seatback when locked; and
      a second unlock mechanism having a second button for unlocking said second lock mechanism to thereby allow movement of said headrest stay downward toward said seatback; and
      a second housing for accommodating said second lock mechanism, wherein said second housing has a second opening for allowing direct manipulation of said second button;
   wherein a pressing outside surface of said first button in said first position corresponds at least to an outside surface of said first opening of said first housing or further inward in a pressing direction away from said outside surface of said first opening,
   wherein said pressing outside surface of said first button in said second position is further inward than in said first position in said pressing direction away from said outside surface of said first opening, and
   wherein a pressing outside surface of said second button protrudes outside of an outside surface of said second opening of said second housing.

2. The vehicle seat according to claim 1, wherein said first headrest bushing is mounted to said seatback and wherein said first lock mechanism and said first unlock mechanism protrude outside of said seatback.

3. The vehicle seat according to claim 1, wherein said first headrest stay has a first notch consisting of a horizontal surface and an inclined surface, wherein a depth of said first notch decreases gradually along said inclined surface in an upward direction toward said headrest, and wherein said horizontal surface of said first notch engages with said first lock mechanism when locked.

4. The vehicle seat according to claim 1 wherein said second headrest bushing is mounted to said seatback and wherein said second lock mechanism and said second unlock mechanism protrude outside of said seatback.

5. The vehicle seat according to claim 1, wherein said second headrest stay has a second notch consisting of a horizontal surface and an inclined surface, wherein a depth of said second notch decreases gradually in a downward direction away from said headrest, and wherein said horizontal surface of said second notch engages with said second lock mechanism when locked.

* * * * *